United States Patent Office 3,158,488
Patented Nov. 24, 1964

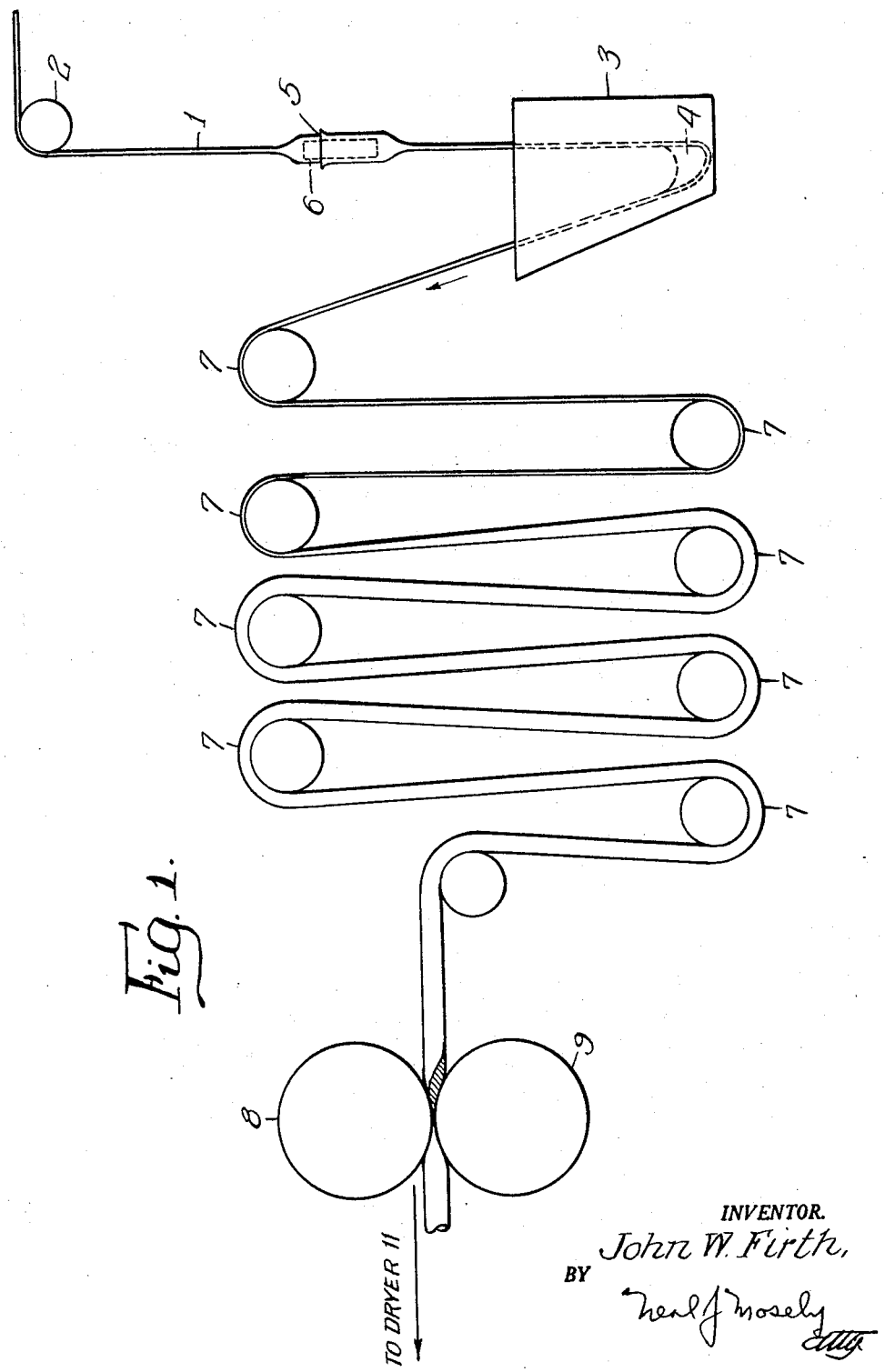

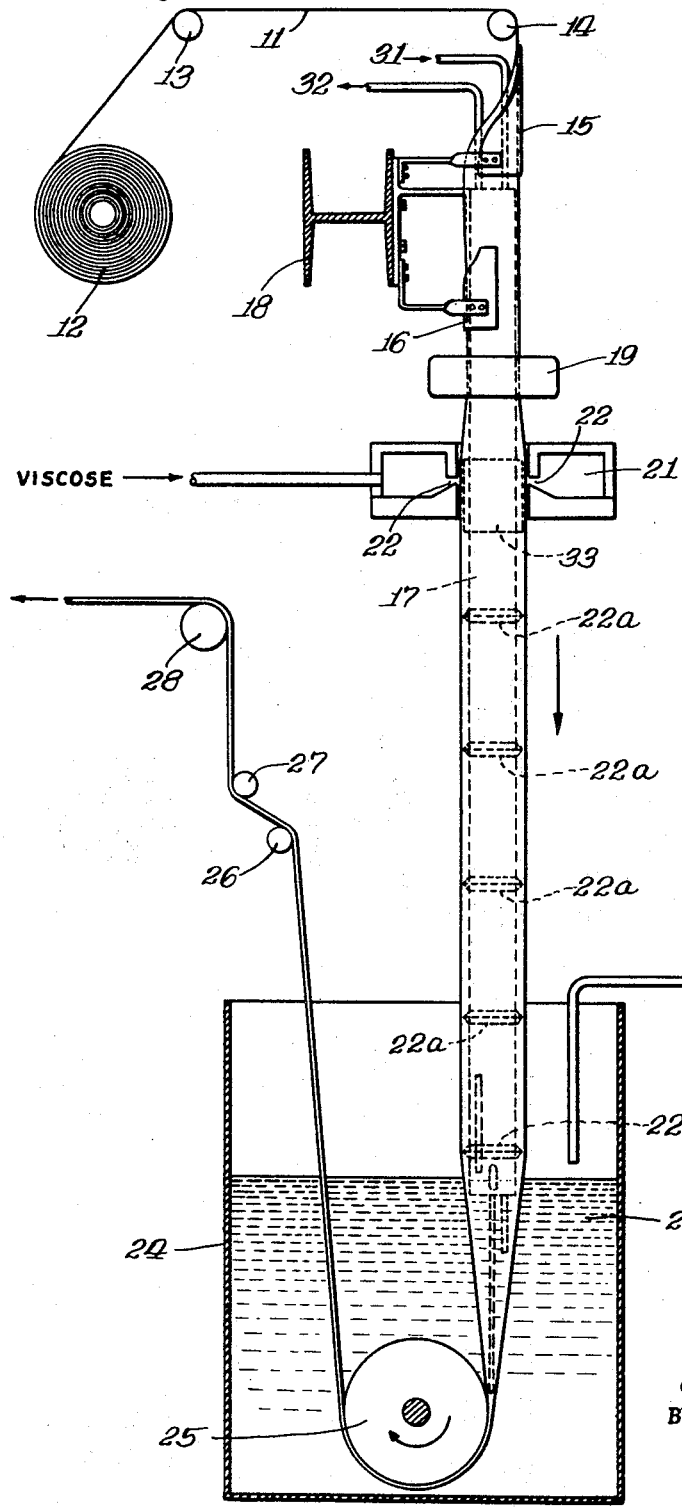

3,158,488
DRY SAUSAGE PREPARATION AND CASINGS THEREFOR
John W. Firth, Chicago, Ill., assignor to Tee-Pak, Inc., Chicago, Ill., a corporation of Illinois
Filed Aug. 20, 1962, Ser. No. 217,805
9 Claims. (Cl. 99—109)

This invention relates to new and useful improvements in sausage casings and to improvements in the manufacture of "dry" sausages.

Dry sausage, of which the various salamis and cervelats are prime examples, is conventionally processed by drying, hence the name, and is ordinarily served cold, without further cooking, by the housewife. Its manufacture customarily involves mixing desired proportions of fat and lean meats, beef or pork, with selected spices, seasonings and curing materials to form an emulsion which is initially cured at a few degrees above freezing (36° to 38° F.) for two or three days depending upon the size of the meat particles so that they will be preserved sufficiently to be smoked and dried. The chill-cured meat emulsion is then firmly packed into casings of suitable size and shape, and the ends of the casings tied ready for delivery to the drying room or smoke house dependent on the type of sausage. A "smoked dried sausage" is smoked and then dried, while "unsmoked dried sausage" is dried only. The drying or curing time will vary with the particular variety of sausage being produced. However, 90 days is usually considered a minimum time and 120 days more satisfactory although the drying period may under some circumstances be extended to six months and even longer.

Previously, the sausage meat emulsions were stuffed into casings formed of natural materials or animal products, such as sewn beef middles and hog casings. More recently, considerable interest has been developed in utilizing certain synthetic materials out of which such casings could be formed. Particularly, the industry has turned to the use of casings formed of regenerated cellulose per se or of the product known in the art as "fibrous casing" and which is composed of cellulosic fibers impregnated and held together by regenerated cellulose.

The use of such synthetic materials is not only desirable because of the greater control over the supply that can be exercised in keeping with the rapid growth in demand for the various packaged and/or encased meat products, but also the material can be conveniently synthesized and extruded into seamless tubular form of preselected diameter. Most importantly, casings formed of the aforesaid fibrous material, unlike the natural product, can be made sufficiently flexible as well as durable to be advantageously used in the stuffing step while also being sufficiently non-elastic that they will not stretch out of shape during or subsequent to stuffing but will retain a more constant shape and size corresponding to that to which it was initially fabricated. This, of course, permits a definite relation to be established between number of slices of the sausage and weight which may be assembled as a unit, and is obviously a highly desirable characteristic in the mechanical high speed packaging methods employed today. In addition, the cellulosic casings are much more sanitary than natural casings and are more economical to use where they do not require tying with strings to maintain their shape.

However, one of the essential drawbacks of such cellulosic materials is their lack of ability to shrink with the sausage during the drying of the sausage emulsion. In the preparation of "dry" sausages, the sausage tends to shrink away from the cellulosic casing and leave gaps between the meat and the casing in which there is a tendency for mold and/or so called "brown ring" to develop. This trouble is not encountered where natural casings are used since natural casings tend to expand and contract with the sausage during curing.

It is, therefore, one object of this invention to provide an improved cellulose casing which adheres to a dry sausage emulsion and follows the shrinkage of the sausage during curing.

A further object of this invention is to provide a method of treating a sausage casing to cause the same to adhere to sausage and follow the shrinkage thereof during curing. Still another object of this invention is to provide a method of coating casings of regenerated cellulose materials to cause the same to adhere to meat encased therein and to follow the shrinkage of the meat during curing.

A feature of this invention is the provision of a regenerated cellulose casing of tubular shape having the inner surface thereof coated with an acetylated monoglyceride or a mixture of an acetylated monoglyceride and gelatin or equivalent proteinaceous material.

Another feature of this invention is the provision of a process for manufacture of sausages in which a cellulosic casing is coated, prior to stuffing with the meat, with an acetylated monoglyceride or a mixture of an acetylated monoglyceride and gelatin, which causes the casing to adhere to and shrink with the meat during drying and to substantially eliminate the problem of "brown ring" formation in the resulting sausage.

Other objects and features of this invention will become apparent from time to time throughout the specification and claims as hereinafter related.

SUMMARY OF THE INVENTION

This invention is based upon my discovery that regenerated cellulose casings, including regenerated cellulose films, paper reinforced cellulose casings, both in flat shape form and in tubular form, can be treated with an acetylated monoglyceride or a mixture of acetylated monoglyceride and gelatin (or equivalent proteinaceous material, e.g., albumin) to produce a thin coating thereon which is effective in causing the casing to adhere to "dry" sausage emulsion and follow the shrinkage of the sausage during curing. The acetylated monoglyceride has the further property of inhibiting from this growth and preventing "brown ring" formation and other surface mold formations which are encountered where sausage shrinks away from the casing during curing upon extended storage.

In carrying out this invention, the acetylated monoglycerides which are used are of the formula

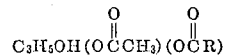

where R is an aliphatic radical derived from $C_6$–$C_{22}$ fatty acid. While acetylated monoglycerides of unsaturated fatty acids are operative in this process, it is generally preferred to use acetylated monoglycerides of saturated fatty acids to avoid oxidative degradation of the acid radical which sometimes occurs in unsaturated acids. The following acetylated monoglycerides can be used in carrying out this invention, although the invention is not limited to the use of these specific compounds: acetylated glyceryl monostearate, acetylated glyceryl monooleate, acetylated glyceryl monopalmitate, acetylated glyceryl monobeheanate, acetylated glyceryl monolaurate, acetylated glyceryl monocaprate, and mixtures thereof. In particular, a mixture of acetylated monoglycerides sold under the trademark Myvacet 500, which is a mixture of approximately 70% acetylated glyceryl monostearate and 30% acetylated glyceryl monopalmitate, is especially useful as a coating for regenerated cellulose casings in carrying out this invention.

In carrying out this invention, the acetylated monoglyceride or mixture of acetylated monoglyceride and gelatin is applied to the ultimate meat-contacting surface of the casing (or sheet material from which the casing is to be formed) so that an amount in the range of about 0.01 to 1.0% of the acetylated monoglyceride and up to about 0.5% of gelatin, based on the weight of the casing, is incorporated in the masing. Lesser or greater amounts of each ingredient may be used as desired, although, very great increases in the amount of either ingredient cannot materially increase the effectiveness of the treatment. As previously noted, the inclusion of gelatin in the coating composition is optional although certain beneficial effects have been observed from its inclusion.

The coating of acetylated monoglyceride or mixture of acetylated monoglyceride and gelatin can be applied to the casing surface in any desired way; thus, application to conventional regenerated cellulose casing, fibrous casing, or any other kind of casing can be made by coating the inside surfaces of the tubular casing by a technique which involves the use of a "bubble" of aqueous solution, emulsion, or suspension of the coating ingredients inside the tube. In this method of coating, the casing moves while the bubble of liquid remains still with the result that the inner surface of the casing is wetted and then moves on beyond the bubble to a drying atmosphere.

This technique is better illustrated in the following description of the bubble coating method as applied to a commercial production line of either regenerated cellulose tubing or casing or paper reinforced regenerated cellulose casing which is known in the trade as "fibrous casing."

In the accompanying drawings, to be taken as a part of this specification, there is clearly and fully illustrated a preferred embodiment of this invention, in which drawings, FIG. 1 is a diagrammatic view illustrating the formation of an interior coating in sausage casing prior to its introduction into a dryer, and FIG. 2 is a diagrammatic view illustrating the formation of fibrous casing prior to the coating step carried out in FIG. 1.

Referring to FIG. 1 of the drawing, casing which may be wet fibrous casing or wet regenerated cellulose casing 1 in a collapsed flat form is transferred from a bath (not shown) in which the casing has been washed after being impregnated with viscose followed by regeneration, or in the case of regenerated cellulose casing after regeneration (both of these being well konwn processes for the production of fibrous or regenerated cellulose casing) into a slack box 3, by passage over "carry-over rolls" 2. Between the rolls 2 and the slack box 3, an aqueous solution consisting of 1% Myvacet 500 in distilled water is placed within the casing 1, the solution being admitted through a cut 5 in the casing 1 before "rubber couplers" 6 are tied into the casing 1. The solution can be made by mixing Myvacet 500 with water and heating to about 70° C., preferably with agitation. While the solution is more stable using distilled water, the process is operative when solutions are made from Myvacet 500 and city water. While a 1% solution of Myvacet 500 is adequate for the purposes of this invention, the concentration of solution may vary widely from as low as 0.2% to as high as 2.0%. In some cases, it is desirable to add 0.1 to 1% gelatin to the aqueous solution of Myvacet 500.

The bubble 4 of the emulsion lies at the bottom of the slack box 3, and as the casing 1 moves as shown, the interior of the casing 1 is progressively contacted with the bubble 4, and is forced upen to conform to the configuration of bubble 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is further dried at a temperature of about 200° F. for about five minutes. In this last drying step, the coating ingredients become firmly attached to the surface of the casing.

The drying time and temperature are interdependent factors insofar as effecting the drying of the casing and the nature of the resulting film are concerned, as will be apparent to those skilled in the art. Other combinations of time and temperature besides those illustrated above can be used, provided, of course, that the temperature is not so high and time not so long that the casing itself is injured due to weakening, discoloration, embrittlement, or the like. For the best results, the temperature of about 175° F. or higher should be used.

Under the above described conditions, a number of runs were made, using fibrous casing as the casing being treated, as follows:

*Example 1*

Various casings were coated on the inside using the above described application technique, the coating consisting of a 1.5% aqueous solution of Myvacet 500 or two parts of Myvacet 500 and one part of gelatin.

The casings were stuffed with salami emulsion, cured over a period of six to eight weeks as a temperature of 50° F. and relative humidity of 70%. Over this extended period of time, there was a very substantial shrinkage of the sausage as the sausage emulsion was cured, and in each case the casing adhered to and followed the shrinkage of the sausage so that there was no separation of the casing and the cured sausage. The casings which contained both Myvacet 500 and gelatin in the coating were found to strip from the sausage with some tendency to pull away meat. In several months' commercial manufacture of fibrous casings prepared in this manner, it has been found that the casings adhere to and follow the shrinkage of the sausage during curing while untreated casings are largely ineffective and subject to the objections previously discussed.

COATING OF FIBROUS CASING DURING FORMING

Another application technique by means of which a coating of acetylated monoglyceride (or mixture of acetylated monoglyceride and gelatin) can be applied to the inside of a casing, is by applying such coating to the inside of fibrous casing as the latter is being produced in accordance with well known procedures. Fibrous casing in made by passing a ribbon of paper around a mandrel to form a tube, applying viscose to the outside surfaces of the paper tube and inbetween the overlapped portion thereof which is to become a seam, and then passing the tube down through a coagulating bath containing acid wherein regeneration of the viscose takes place, then washing and drying the tube according to the procedures described, for example, in U.S. Patent Nos. 1,937,225 and 2,045,349.

Referring to FIG. 2 of the drawings a ribbon of paper 11, of the type described in U.S. Patent No. 2,045,349, and which is preferably a long fiber hemp paper weighing 12½ lbs. per ream, passes from roll 12 over rollers 13 and 14 and around formers 15 and 16 which form the paper into tubular form, then proceeds downwardly over the mandrel 17. Mandrel 17 which may be a steel pipe having an outside diameter of 2 to 7 inches, more or less, depending on the size of the tube or casing which is to be produced, may be of any suitable length, conveniently about 30 feet long, and, as shown, can be suspended from a suitable support such as an "I" beam 18 or the like. The paper 11, now shaped in the form of a tube, passes downwardly over the mandrel 17, through a forming ring 19 which is a metallic ring having an inside diameter slightly larger than the diameter of the tube-shaped paper passing through it, and whose purpose it is to maintain the paper in tubular form until it reaches the coating die 21. Coating die 21 is essentially a hollow ring structure made of metal or the like and contains an annular opening 22 circumferentially of its inside diameter through which viscose, which is contained under positive pressure in the chamber of the die 21, is applied to the outer surfaces of the downwardly moving paper tube to uniformly coat it with viscose. A sleeve 33 formed of metal or the like which is shrunk onto the mandrel 17 functions to effect more uniform application of viscose through the orifice 22 as the paper 11 passes downwardly thereover.

A number of slip rings 22a which may be shrunk onto the mandrel 17 every three feet or thereabouts, and which are made of metal or the like, serve to keep the inside wall of the viscose-impregnated paper tube from scraping against the outside wall of the mandrel 17, as the tube moves downwardly.

Continuing in its downward movement the viscose-impregnated paper tube enters a coagulating bath 23 of 5% sulfuric acid contained in a suitable vessel 24. On being contacted with the acid, conversion of the viscose to regenerated cellulose begins and continues as the tube moves around the roller 25, over and under wiper rods 26 and 27, roller 28 and then through washing baths and drying tunnels not shown here, but being similar to those used in the art of making regenerated cellulose casings as exemplified in U.S. Patent 1,937,225 and related patents.

Acid for the bath 23 is supplied through pipe 29. The same kind and concentration of acid is supplied through the inside of the mandrel 17 through a pipe 31, spent acid being removed through pipe 32, at a rate which is balanced by the incoming acid, as shown. The speed of the casing in its downward movement is approximately 20 feet per minute and the contact time in the bath 23 is of the order of 50 seconds.

In applying the coating of acetylated monoglyceride (or mixture of acetylated monoglyceride and gelation) to the inside of casing such as that described above, I incorporate the acetylated monoglyceride (or mixture of acetylated monoglyceride and gelatin) with the inlet acid which enters at pipe 31. A preferred composition consists of 0.1 to 2.0% Myvacet 500 and 0 to 1.0% gelatin in the acid solution.

Besides the foregoing techniques for applying coating of acetylated monoglyceride (or mixture of acetylated monoglyceride and gelatin) to the inside surfaces of casing, such coating can also be applied to the surface or surfaces of cellulosic sheets themselves before they are formed into tubes. For example, sheets of cellulose impregnated fibrous sheeting can be treated in accordance with the present invention by applying to the surface thereof acetylated monoglyceride (or mixture of acetylated monoglyceride and gelatin) from a solution, suspension or emulsion in amount sufficient to uniformly coat the surface. After such treatment, the sheeting can be formed into a tube by any conventional technique; acetylated monoglyceride (or mixture of acetylated monoglyceride and gelatin) coating being applied to the sheet after it has been impregnated with cellulose, and conveniently by putting the coating material in a bath through which the sheet passes prior to being dried. It can also, of course, be applied to the sheet after the sheet has been washed and dried.

It is seen from the above that the technique of the present invention results in the production of highly and unexpectedly superior fibrous and other casings with respect to the performance characteristics of such casings when used as containers for sausage items which are designed for "pre-sliced" packaging. The application is simple and lends itself to easy adaptation within the well known commercial fabrication of fibrous casing; it involves the use of extremely small amounts of materials which are relatively easy to apply and which are surprisingly effective for the purpose of this invention, and which do not adversely affect desirable permeability characteristics of the casing with respect to moisture vapor, smoke, dyeing and the like. As described above, the coating of acetylated monoglyceride (or mixture of acetylated monoglyceride and gelatin) is effective to cause the casing to adhere to "dry sausage" during curing and to cause the casing to shrink with the sausage during the curing process. As previously noted, the inclusion of gelatin in the coating of the casing increases adhesion of the casing during curing.

While I have particularly described the applicability of this invention to the treatment of regenerated cellulose and fibrous casings, it will be seen that it is also applicable to coating the inside surfaces of such products as regenerated cellulose casing and fibrous casing whose outside surfaces are coated with saran, casings coated on the outside with polymer compositions such as the casings described in U.S. Patent 2,812,259 to Arthur Mark, U.S. Patents 2,627,471 and 2,627,483 to Laurence E. Dowd, fibrous alginate casings, and the like.

It is, of course, to be understood that the foregoing examples are illustrative only and are not to be construed in a limiting sense since changes within the scope and spirit of my invention will suggest themselves to those skilled in the art.

What is claimed is:

1. A regenerated cellulose tubular sausage casing for processing dry sausage, said casing having the inner surface thereof coated with 0.01–1.0% of an acetylated monoglyceride of a fatty acid and 0 to 0.5% gelatin, whereby the casing shrinks with and adheres to the surface of dry sausage therein.

2. A casing in accordance with claim 1 in which the casing is of a paper-reinforced regenerated cellulose.

3. A casing in accordance with claim 1 in which the acetylated monoglyceride is of the formula

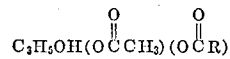

where R is $C_{15}$–$C_{17}$ alkyl.

4. A sausage casing blank comprising a sheet of regenerated cellulose having one surface coated with 0.01–1.0% of an acetylated monoglyceride of a fatty acid and 0 to 0.5% of gelatin, whereby said surface will adhere to and shrink with a dry sausage encased in a casing formed of said blank.

5. A sausage casing blank in accordance with claim 4 in which the acetylated monoglyceride is of the formula

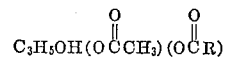

where R is $C_{15}$–$C_{17}$ alkyl.

6. A sausage casing blank in accordance with claim 4 in which said sheet of regenerated cellulose comprises a sheet of paper-reinforced regenerated cellulose.

7. A sausage casing blank in accordance with claim 6 in which the acetylated monoglyceride is of the formula

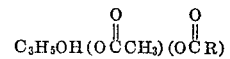

where R is $C_{15}$–$C_{17}$ alkyl.

8. In the manufacture of dry sausage wherein sausage meat emulsion is stuffed into casings of regenerated cellulosic material and stored for an extended time in an atmosphere of controlled temperature and humidity to dry the encased meat emulsion uniformly, the improvement which comprises coating the interior of the casing, prior to stuffing with meat, with 0.01–1.0% of acetylated monoglyceride of a fatty acid and 0 to 0.5% of gelatin, whereby the casing shrinks with the meat during drying and the finished sausage is substantially free from brown ring formation.

9. A method in accordance with claim 8 in which the acetylated monoglyceride is of the formula

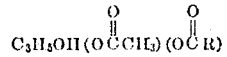

where R is $C_{15}$–$C_{17}$ alkyl.

References Cited in the file of this patent

UNITED STATES PATENTS

| | | |
|---|---|---|
| 2,045,349 | Goodman | June 23, 1936 |
| 2,352,611 | Bowers | July 4, 1944 |
| 2,901,358 | Underwood et al. | Aug. 25, 1959 |
| 2,982,660 | Brissey et al. | May 2, 1961 |
| 3,106,471 | Firth | Oct. 8, 1963 |